Dec. 19, 1944.  M. R. BELL  2,365,328
PROTECTIVE SHIELD
Filed Dec. 10, 1941
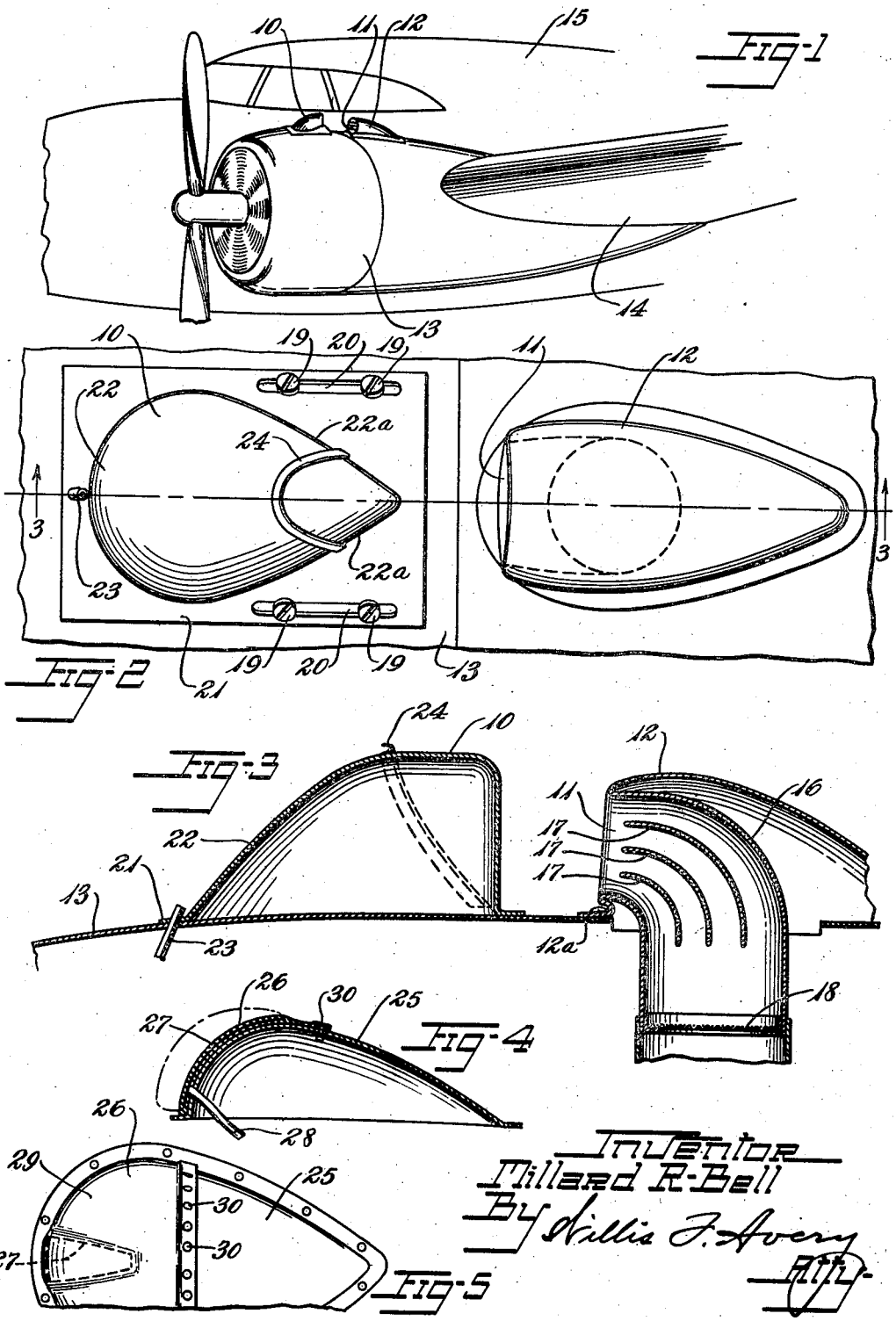
Inventor
Millard R. Bell Patented Dec. 19, 1944

2,365,328

UNITED STATES PATENT OFFICE 2,365,328

PROTECTIVE SHIELD

Millard R. Bell, Los Angeles, Calif., assignor to The B. F. Goodrich Company, New York, N. Y., a corporation of New York Application December 10, 1941, Serial No. 422,343

4 Claims. (Cl. 98—13)

This invention relates to means for protecting parts of aircraft and other structures which are exposed in air flow to icing conditions. The invention is useful in preventing the accumulation of ice and in reducing or eliminating contact of stones, dirt, oil and other foreign matter with such parts, and it is advantageous especially in preventing the accumulation of ice on and in air scoops, including the air intake manifolds of aircraft.

The problem presented heretofore by the formation of ice on and in the air intakes of aircraft has been difficult of solution, particularly since the turning vanes desirable in the scoop for providing smooth air-flow to the carburetor have in many cases supported ice and permitted bridging of the ice over the vanes and over the mouth of the scoop.

Prior expedients utilizing anti-icing liquids have had the objection of polluting the air, and expansible ice-removing devices alone have not been entirely satisfactory owing to consequent restricting and disturbing effects on the air flow into and through the scoop.

The chief objects of the present invention are to provide means for protecting the exposed portions of air intake manifolding from the accumulation of ice and from the entrance of dirt, oil and objectionable amounts of water and other foreign matter; to provide means for preventing the accumulation of ice in and on the carburetor air scoops of aircraft, while permitting adequate air-flow for proper carburetion; to provide for a minimum of aerodynamic drag, and to provide for simplicity and economy of manufacture.

These and further objects will be apparent from the following description, reference being had to the accompanying drawing in which:

Fig. 1 is a perspective view of a portion of an airplane having protective means mounted thereon constructed in accordance with and embodying the invention.

Fig. 2 is a plan view of the protective means on an enlarged scale.

Fig. 3 is a section taken along the line 3—3 of Fig. 2.

Fig. 4 is a view in longitudinal section of a modified construction.

Fig. 5 is a plan view of the modified construction of Fig. 4, parts being broken away.

In the illustrative embodiment of the drawing, a protective shield 10 of streamline shape is mounted forwardly of and is spaced, preferably adjustably, from air intake opening 11 of a carburetor air scoop 12. As shown in Fig. 1, the air scoop 12 is mounted on top of a motor nacelle 13 of a wing 14 of an airplane, indicated generally at 15. Alternatively, the air scoop 12 may be mounted at any other suitable position on the nacelle 13 or aircraft and the protective shield 10 provided forwardly of the scoop 12 and in substantially the same relative position with respect thereto.

The air scoop 12, in the form shown in the drawing, comprises a tubular portion 16 for conducting air to the carburetor of a motor of the airplane 15 after the air enters the opening 11 from the airstream. Turning vanes 17, 17 provide for smoothness of air-flow, and a screen 18 or other suitable filtering means assists in freeing the carburetor-bound air of foreign matter.

The protective shield 10 may be mounted on the airplane in any suitable manner, as for example, adjustably by means of screws 19, 19 in slots 20, 20 in a projecting flange portion 21 of the shield 10 as shown, the slots 20, 20 permitting adjustment of the distance between the shield 10 and the opening 11 of the air scoop 12.

The forwardly-projecting surface 22 of the streamline shield 10 is preferably provided of an area such that the entire opening 11 of the air intake 12 is shielded. The rounded surface 22 of the shield 10 provides an area for the impingement of water and snow, and also for the impingement and deflection of dirt, stones, oil and other foreign matter. Whereas water and snow heretofore have formed ice on the scoop 12, in some cases completely closing the opening 11 in the scoop 12, the dirt, oil and other foreign matter have entered the air intake and have mixed objectionably with the air supplied to the carburetor or clogged the air filter 18 in the intake manifolding 16, the shield 10 serving to guard against this.

I provide that accumulations of ice will be on the shield 10 where its presence will not be harmful to the operation of aircraft and the flow of air to the air scoop 12 will be substantially undiminished.

Particles of water, dirt and the like not deposited on the shield will be carried over and past the critical area of the opening 11 of the scoop 12, without appreciably interfering with the cleanness of the aerodynamic contours of the aircraft. In this action the inertia of such moisture and particles assists them in passing the scoop, and good results in this respect have been obtained with a shield having lateral dimensions slightly greater than those of the scoop.

Rearward surfaces 22a, 22a of the shield 10 of the shape shown, but which may be constructed of any other suitable streamline shape, permit free flow of air to the scoop 12, the air having greatly reduced moisture content as well as greatly reduced content of other undesirable foreign matter. It has also been found that the streamlined shield construction of the invention provides for a more uniform flow of air into the air scoop, layers of entering air from wall to wall of the scoop being of more even velocity of flow. The action of diverting moisture and other particles from the scoop while nevertheless providing more uniform flow of air into the scoop, is contributed to by the preferred streamlined shape shown, wherein the rearward side surfaces 22a, 22a taper back to a rearmost surface that rises generally vertically to substantially the top of the shield, see especially Figs. 2 and 3, so that the top does not taper downward toward the rear. Thus the flow of air into the scoop is chiefly from the sides 22a, 22a of the shield and is not disturbed by downward flow of air that would occur if the top of the shield were tapered downward toward the rear.

A suitable anti-freeze liquid may be fed into the protective shield 10, if desired, to minimize the accumulation of ice on the shield, as for example, by means of a suitable feeding tube 23 at the leading end of the shield as shown in Figs. 2 and 3, or by any other suitable means. A suitable drip strip 24 may be provided, if desired, to conduct inwardly toward the cowling of nacelle of the aircraft anti-freeze liquid or accumulations of water which may flow along the surface of the shield so that such liquid will not be carried into the air-scoop. The air-scoop 12 is preferably provided with grooved portions at the front and sides to guide such liquids around the air-scoop 12 and away, as indicated at 12a in Fig. 3.

The modified construction of Figs. 4 and 5 comprises an alternative shape of streamlined shield 25 more nearly in the shape of a tear-drop. In these figures also the construction comprises an inflatable covering 26 mounted on the entering surface thereof for breaking-up accumulations of ice on the shield. The inflatable covering 26 may be of any suitable construction, but preferably comprises an inflatable tube 27 centrally of the entering surface of the shield 25 and connected by means of a pipe member 28 to a source of inflating fluid (not shown). A layer of elastic material 29 overlying the inflatable tube 27 and extending preferably over the entire entering surface of the shield 25 and secured as by means of rivets or bolts back of the entering surface, as indicated at 30, 30, is distorted and stretched when the tube 27 is inflated to break-up ice formations on the shield 25 and permit the removal of the broken ice by air-flow past the shield. The inflated position of the covering is indicated by broken lines in Fig. 4.

While I have described my invention with particular reference to the protection of carburetor air-scoops, features of the invention are applicable to the prevention of the accumulation of ice on other elements similarly exposed to icing conditions.

Variations may be made without departing from the scope of the invention as it is defined by the following claims.

I claim:
1. A shield for protecting an air scoop, said shield comprising a body of streamline form disposed in advance of the mouth of the scoop to shield the mouth from air-borne particles while permitting flow of air into the scoop around the streamline surface of the shield, and said streamline surface including a rounded frontal portion and side portions converging rearward to a rearmost portion extending vertically throughout substantially the vertical depth of the shield.

2. A shield as defined in claim 1 in which the maximum transverse dimensions of said body exceed slightly the corresponding dimensions of said mouth to eclipse the mouth totally.

3. A shield as defined in claim 1 comprising lip means on the surface thereof extending along the sides of the shield and rearwardly toward its base for conducting water on the shield away from the mouth of said scoop.

4. A shielded air scoop assembly comprising an air scoop, a shield therefor, said shield having a streamlined surface including a rounded frontal portion and side portions tapering rearward and overall transverse dimensions not substantially exceeding the corresponding dimensions of the mouth of said scoop, and said shield being disposed in advance of said mouth at a position to deflect air borne particles into paths to the sides of the scoop so that their inertia prevents their entrance into said mouth, while the shield permits flow of air around the shield and into said mouth.

MILLARD R. BELL.